Patented May 12, 1931

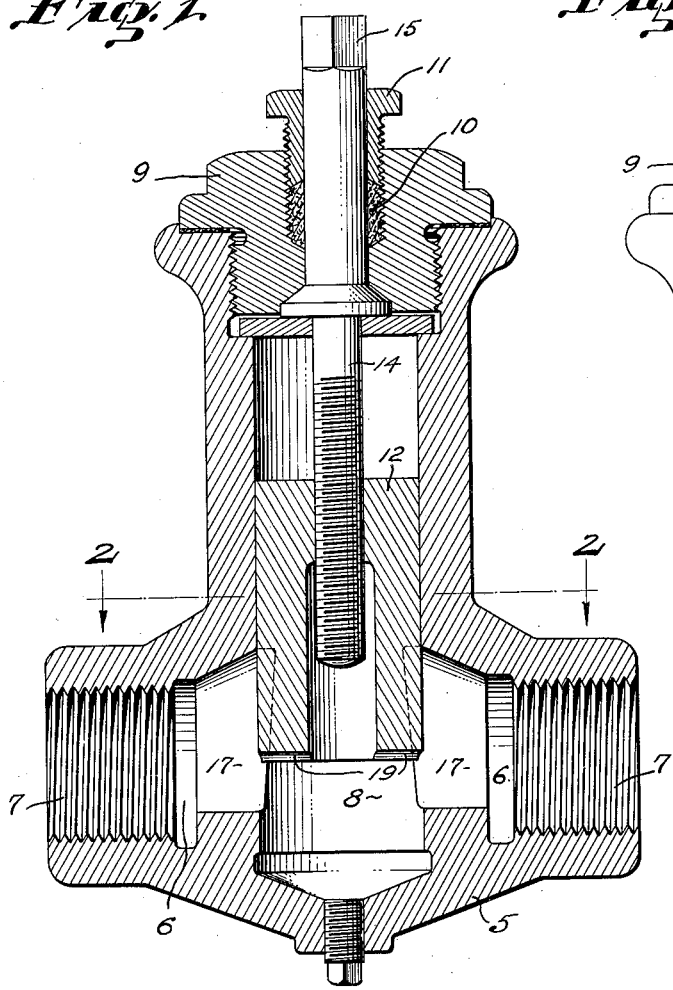
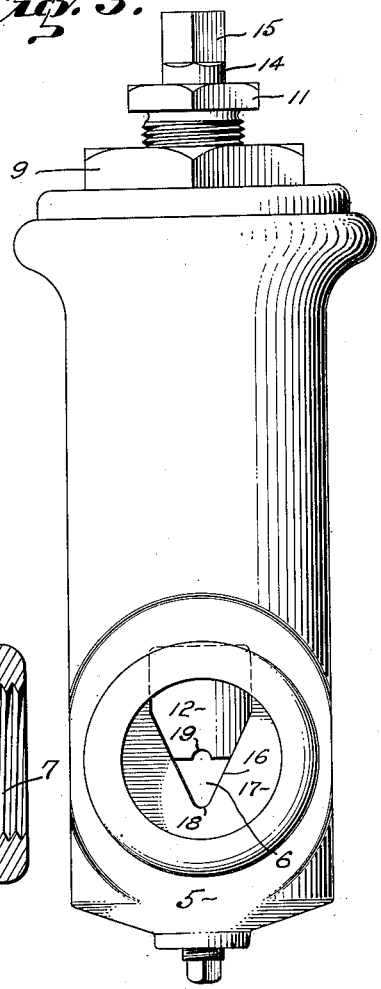
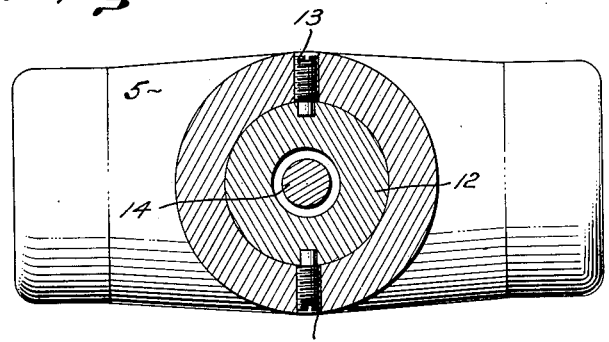

1,805,106

UNITED STATES PATENT OFFICE

HENRY H. ROBINSON, OF LOS ANGELES, CALIFORNIA

VARIABLE FLOW RESISTANCE

Application filed January 27, 1930. Serial No. 423,757.

In this specification, and the accompanying drawings, I shall describe and show a preferred form of my invention, and specifically mention certain of its more important objects. I do not limit myself to the forms disclosed, since various changes and adaptations may be made therein without departing from the essence of my invention as hereinafter claimed; and objects and advantages, other than those specifically mentioned, are included within its scope.

This invention relates to means for introducing variable flow resistances in pipe lines, and constructions therefor. Its principal object is to provide an improved and greatly simplified device that is adapted for the purpose, and one that is relatively inexpensive to produce. My objects are attained in the manner illustrated in the accompanying drawings, in which:—

Figure 1 is a side elevation of my improved construction in central section;

Figure 2 is a plan view of the above construction, shown partly in section taken on the plane 2—2 of Fig. 1; and, Figure 3 is an end elevation of the above device.

Similar reference numerals refer to similar parts throughout the several views.

In considering the following description, it is to be borne in mind that the primary purpose of the invention is to provide a variable flow resistance, and not a shut-off valve that is intended to be tight under pressure. Therefore, although the device may be utilized as a valve in certain cases, where slight leakage under pressure is unobjectionable, this is not its main purpose.

In the embodiment of my invention that has been selected for illustrative purposes, the body of the fitting is indicated at 5. This has a flow passage 6, therethrough, the extremities of the flow passage being adapted for connection to a pipe line, by means of tapping or otherwise, as indicated at 7. The flow-passage is intermediately intersected by a transverse cylindrical bore 8, extending laterally therefrom through a lateral projection of the body. Bore 8 is closed at its outer end by means of a cap 9, which carries a stuffing box 10, and gland 11. A cylindrical plug 12 is adapted to be moved longitudinally within bore 8; and, at its lowermost position to completely intercept the flow passage 6. This plug is provided with one or more longitudinal slots in its periphery, located so as not to be in communication with flow passage 6, when the plug is in its closed position; and it is prevented from rotating by means of screw-keys 13, which are tapped through the body projection and engage these slots. This construction is indicated in Fig. 2.

Plug 12 is longitudinally positioned by means of a screw threaded stem 14 which it engages; the outer end of the stem passing through stuffing box 10, and having means at its outer extremity for rotating it, such as the wrench-head 15. In the construction illustrated and described, stem 14 is non-rising; but obviously an equivalent construction, with a rising-stem, can be substituted if preferred.

The device described is capable of variably altering the effective area of flow passage 6. I prefer, however, to construct the flow passage and plug in the manner illustrated, for securing fine adjustments of the device when the flow passage is nearly closed. I accomplish this by means of triangular shaped orifices 16, through relatively thick integral diaphragms 17 that partially intercept the flow passage. The triangular orifices are disposed with their apexes 18 at the bottom, as shown in Fig. 3; and these apexes are preferably rounded as indicated. Moreover, the apexes are located above the bottom of the flow passage, to prevent cutting of the latter when the device is in its nearly closed position, and when the flow is under heavy pressure. I also prefer to make a semi-cylindrical groove 19 across the inner extremity of plug 12, parallel to the axis of the flow passage, and adapted to co-operate with apexes 18 to form a rounded flow passage of small area, when the device is nearly closed.

From the foregoing description, it will be seen that, by reason of the triangular orifices 16, the effective area of the flow passage may be closely adjusted when the device is nearly closed, as well as when it is fully open.

It will be obvious from the above description that the construction is extremely simple and inexpensive to produce, no machining operations, other than boring, turning, and screw-threading, being required. There are no flat co-operating surfaces to be faced by planing or shaping. As indicated above, there may be slight leakage around plug 12 when the device is closed and under pressure; but such leakage is unobjectionable in services for which this construction is intended, it being merely a means of regulating flow resistances, and not being intended as a tight shut-off valve.

Having thus fully described my invention, I claim:

1. Construction of the character described, comprising; a body member having a straight flow passage therethrough, and a laterally extending cylindrical bore intersecting said passage; and a cylindrical plug within said bore, adapted for being longitudinally positioned therein to variably intercept said passage, said passage being of triangular cross-section where it is intersected by said bore; one pair of the opposed apexes of the triangular sections of the flow passage being rounded, spaced from the main wall of the passage, and being so disposed as to afford the only openings through the flow passage when the plug is in its nearly closed position.

2. Construction as set forth in claim 1 wherein the plug is non-rotative and is provided with a semi-cylindrical groove across its inner extremity, whereby it is adapted to co-operate with said pair of rounded apexes to form substantially round flow orifices.

HENRY H. ROBINSON.